(12) United States Patent
Gilmour et al.

(10) Patent No.: US 6,668,645 B1
(45) Date of Patent: Dec. 30, 2003

(54) OPTICAL FUEL LEVEL SENSOR

(75) Inventors: Daniel A. Gilmour, West Hartford, CT (US); John R. Forgue, Cheshire, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 0 days.

(21) Appl. No.: 10/174,425

(22) Filed: Jun. 18, 2002

(51) Int. Cl.[7] .................. G01F 23/00; G01F 23/292
(52) U.S. Cl. .................. 73/290 R; 73/290 R; 73/293; 250/577; 250/902; 250/573; 340/618; 340/619
(58) Field of Search .................. 73/290 B, 293; 250/577, 902, 573; 340/618, 619

(56) References Cited

U.S. PATENT DOCUMENTS

| | | |
|---|---|---|
| 3,120,125 A | 2/1964 | Vasel |
| 3,384,885 A | 5/1968 | Forbush |
| 3,766,395 A | 10/1973 | Keir |
| 3,818,470 A | 6/1974 | Hirsbrunner et al. |
| 3,864,577 A | 2/1975 | Pellett et al. |
| 4,155,013 A | 5/1979 | Spiteri |
| 4,201,914 A | 5/1980 | Perren |
| 4,242,590 A | 12/1980 | von Tlück |
| 4,286,464 A | 9/1981 | Tauber et al. |
| 4,354,180 A | 10/1982 | Harding |
| 4,427,293 A | 1/1984 | Harmer |
| 4,713,552 A | 12/1987 | Denis et al. |
| 4,840,137 A | 6/1989 | Beauvais et al. |
| 4,961,069 A | 10/1990 | Tsaprazis |
| 4,998,022 A | 3/1991 | Tregay |
| 5,159,834 A | 11/1992 | Eisele |
| 5,534,708 A | 7/1996 | Ellinger et al. |
| 6,173,609 B1 * | 1/2001 | Modlin et al. ............... 73/293 |
| 6,429,447 B1 * | 8/2002 | Nowak et al. ............... 73/293 |

* cited by examiner

*Primary Examiner*—Hezron Williams
*Assistant Examiner*—André K. Jackson
(74) *Attorney, Agent, or Firm*—Reising, Ethington, Barnes, Kisselle, P.C.

(57) ABSTRACT

An optical fuel level sensor for providing an electronic signal representative of the fuel level within a fuel tank, generally comprising a waveguide body, a photo source, and a photo receiver. The waveguide body can either be of a dual-tapered or single-taper shape and includes numerous tiered facets, which are angled surfaces located on the outer periphery of the waveguide. When the fuel level within the fuel tank is above a particular tiered facet, light that impinges that facet will refract out of the waveguide, conversely, when the fuel level is below that facet, impinging light will be reflected back into the waveguide such that it is received by the photo receiver. In this manner, the fuel level sensor is able to utilize the reflected light received by the photo receiver to provide an electronic signal representative of the fuel level. Furthermore, a calibration feature may be included which provides calibration information indicating when the fuel level has reached a known, predetermined level.

26 Claims, 3 Drawing Sheets

OPTICAL FUEL LEVEL SENSOR

FIELD OF THE INVENTION

This invention relates generally to an optical fluid level sensor, and more particularly, to an optical fuel level sensor capable of providing fuel level and calibration information via electronic signals.

BACKGROUND OF THE INVENTION

Various types of fuel level sensors have been employed for the purpose of providing fuel level information, particularly in the automotive industry. One such fuel level sensor involves a light conducting waveguide having a photo source and photo receiver, wherein light emanates from the photo source and impinges upon a series of tiered facets located at various depths within the tank. Those facets located above the current fuel level inwardly reflect the light so that it is returned to the photo receiver, while those facets located below the current fuel level outwardly refract the light such that it is never received by the photo receiver. Thus, the sensor is capable of generating an electronic signal representative of the amount of light received by the photo receiver, wherein the amount of light received corresponds to a particular fuel level.

One problem associated with these optical fuel level sensors is that they may experience a long-term drift, or measurement shift, that impacts the accuracy and stability of the sensor's readings. Changes to the photo source output, photo receiver input, or other associated circuitry could be incorrectly interpreted as a change in fuel level. Such a phenomenon is not uncommon for sensor components, and the drifting is typically accelerated by exposure to extreme temperatures and other harsh environmental conditions.

Furthermore, optical fuel level sensor designs such as those discussed above, typically utilize a photo source and receiver located at one axial end of the waveguide. Locating the photo source and receiver at either the very top or the very bottom of the waveguide increases the distance that light must travel, particularly when the fuel tank is completely empty or completely full. For example, when the fuel tank is empty, optical fuel level sensors having photo sources and receivers located at their upper most axial end must emit light from the top of the waveguide such that it travels the entire length of the waveguide, reflects off a dry facet located near the waveguide's lowermost end, and then travels back up the length of the waveguide to the photo receiver. Thus, the light has traveled a total distance roughly equivalent to twice the axial length of the waveguide. The greater the distance that light must travel, the greater the opportunity for signal loss, which can cause the photo receiver to report inaccurate readings.

Therefore, it is a general object of the present invention to provide an optical fuel level sensor that minimizes the effects of long-term drift and signal loss. Features aimed at minimizing those effects may include one or more of the following: a calibration feature, a center mounted photo source and receiver, and an optical fuel level sensor having two tapered axial ends.

SUMMARY OF THE INVENTION

The above noted shortcomings of prior art fuel level sensors are overcome by the present invention which provides an optical fluid level sensor for use with a fluid vessel, comprising a waveguide, a photo source, and a photo receiver. The waveguide is capable of conducting light and has an outer periphery that includes a plurality of tiered facets, each facet is capable of both reflecting light internally within the waveguide and refracting light out of the waveguide depending upon whether or not fluid is in contact with that facet. The waveguide also includes a calibration feature located at a predetermined position. The photo source emits light into the waveguide and the photo receiver receives light exiting the waveguide. The optical fluid level sensor uses the light received by the photo receiver to provide an electronic fluid level signal representative of a fluid level within the vessel, and the sensor further provides calibration information in an electronic signal that identifies when the fluid level reaches the predetermined position. This fluid level sensor can also be implemented as part of a fuel level sensing system to be used with a fuel tank. In addition to the optical sensor, the fuel level sensing system includes a power source having an output for providing a power signal and an interface electronics unit. The interface electronics unit includes a signal input for receiving the electronic fuel level signal and is coupled to the sensor for receiving the calibration information. Furthermore, the interface electronics unit utilizes the fuel level signal to determine the fuel level within the fuel tank, and utilizes the calibration information to calibrate the sensor with respect to the predetermined position.

In accordance with yet another aspect of the present invention, there is provided an optical fluid level sensor for use with a fluid vessel, the sensor comprises a waveguide, a photo source, and a photo receiver. The waveguide conducts light and has a tapered first axial end, a tapered second axial end, and an outer periphery that includes a plurality of tiered facets. Each of the tiered facets reflects light internally within the waveguide and refracts light out of the waveguide according to the presence of fluid against the tiered facet. The photo source is located at a position approximately equidistant from the first and second axial ends and emits light into the waveguide in a first direction generally towards the first axial end and in a second direction generally towards the second axial end. Similarly, the photo receiver is located at a position approximately equidistant from the first and second axial ends and receives light from within the waveguide from the first and second directions. The sensor utilizes the light received by the photo receiver to provide an electronic fluid level signal representative of a fluid level within the vessel. This fluid level sensor can also be implemented as part of a fuel level sensing system to be used with a fuel tank. In addition to the optical sensor, the fuel level sensing system includes a power source for providing a power signal and an interface electronics unit for receiving a fuel level signal from the optical sensor. The sensor utilizes the light received by the photo receiver from the first and second directions to provide the interface electronics unit with the fuel level signal which the interface electronics unit utilizes to determine the fuel level within the fuel tank.

An advantage of this invention is that it provides an optical fuel level sensor which can offset the affects of long term drift of sensor components through the use of a calibration feature. Also, the accuracy of the sensor is increased and the size can be decreased by utilizing a dual-tapered waveguide design having a photo source and receiver mounted near the center of the waveguide. Thus, the optical fuel level sensor of the present invention can be made more accurate and economical to manufacture than other designs that provide fuel level sensing.

BRIEF DESCRIPTION OF THE DRAWINGS

These and other objects, features, and advantages of the present invention will be apparent from the following detailed description of the preferred embodiments, appended claims, and accompanying drawings in which:

DETAILED DESCRIPTION OF THE PREFERRED EMBODIMENTS

Figures 1, 2:
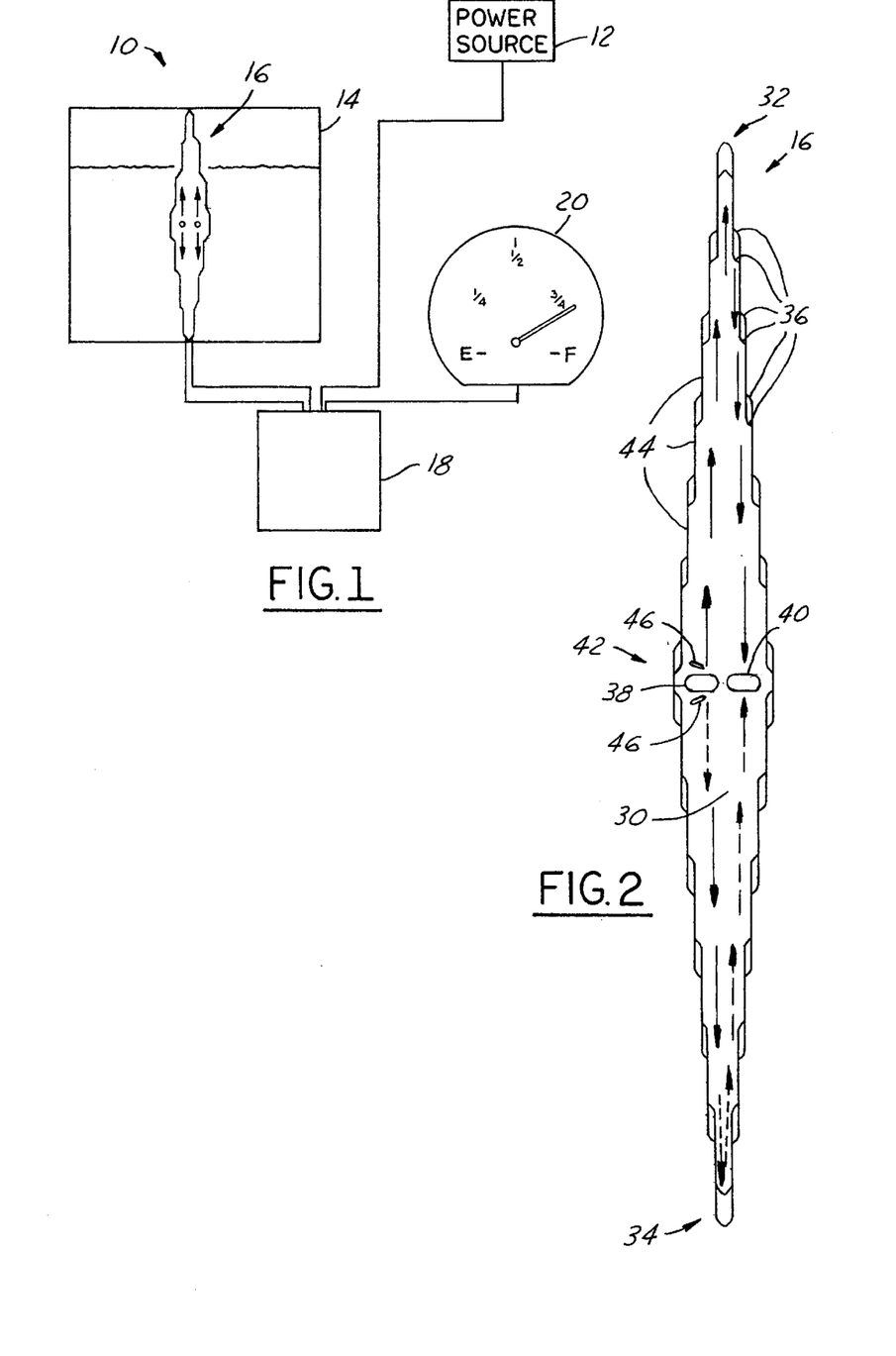
FIG. 1 is a block diagram of a fuel level sensing system, including a first embodiment of the optical fuel level sensor of the present invention.
FIG. 2 is an enlarged view of the optical fuel level sensor seen in FIG. 1.

With reference to FIG. 1, there is shown a fuel level sensing system 10 that measures and displays the relative fuel level within a fuel tank, and generally comprises a power source 12, a fuel tank 14, an optical fuel level sensor 16, a sensor interface electronics (SIE) unit 18, and a fuel gauge 20. The power source, which is typically 12 volts, includes an output terminal for providing the SIE with an electrical power signal. The optical fuel level sensor provides the SIE unit 18 with an electronic fuel level signal indicative of the current fuel level. The SE unit interprets that signal and is capable of performing a wide variety of processing functions, such as controlling a warning light for low fuel level indication, controlling fuel system devices, and performing sensor calibration functions. The SIE generates an electronic output signal that is sent to the fuel gauge or instrument panel computer, which in turn visually informs an operator of the current fuel level.

It should be noted, the fuel level sensing system 10 is not specifically limited to the configuration just described. For instance, the optical fuel level sensor could be directly connected to the fuel gauge, such that the amount of current or voltage associated with the fuel level signal would drive the fuel gauge as an ammeter or voltmeter, respectively. Also, the SIE could be incorporated into either the sensor or the fuel gauge itself, rather than being a separate, standalone device. Furthermore, the fuel level signal could be either digital or analog, and can be processed according to one of any number of techniques commonly known in the art for processing electronic signals.

Referring now to FIG. 2, a first embodiment of optical fuel level sensor 16 of the present invention is seen in further detail, and comprises a waveguide body 30, a first axial end 32, a second axial end 34, a plurality of tiered facets 36, a photo source 38, and a photo receiver 40. Waveguide body 30 is made from an optically conductive material, such as Ultem™ from General Electric, and is of an elongated shape having two tapered axial ends. The upper portion of the waveguide body, that is the segment extending from the center section 42 to first axial end 32, is essentially a mirror image of the lower portion of the waveguide body, which is the segment extending from the center section to second axial end 34. The length of the waveguide varies, depending upon the specific fuel tank or fluid vessel in which it is to be installed. The width of waveguide body 30 is greatest towards center section 42 and tapers as one moves towards either of the two axial ends.

The tiered facets 36 are angled transition surfaces located between adjacent longitudinal waveguide segments 44, and are capable of both reflecting and refracting light according to an optical phenomena commonly known as total internal reflection. There can either be multiple layers of tiered facets, as seen in FIG. 2, wherein different layers are located at different depths within the waveguide, or there can be a single layer of tiered facets, as seen in FIGS. 3–6. By having multiple layers, more tiered facets can be located on the outer periphery of the waveguide, thus improving the resolution of the sensor. The longitudinal waveguide segments extend in a direction generally parallel to the longitudinal axis of the waveguide, which happens to also be the direction in which light emitted from light source 38 travels. Because the longitudinal segments are generally parallel to these light paths, they do not provide an impinging surface for the light to impact. The tiered facets 36, on the other hand, are angled with respect to the direction of light emitted from the light source and, therefore, provide a light reflecting surface. Whether or not light from photo sources 38, which impinges tiered facets 36, will reflect back into the waveguide body or refract out of the waveguide, depends on the fuel level within the fuel tank.

The light source can be an IR LED or any other suitable type of light source capable of emitting light in a first direction which is generally towards first axial end 32 (as represented by the solid arrows) and in a second direction which is generally towards second axial end 34 (represented by broken arrows). Light source 38 emits a wide light path having a width W (seen in FIG. 3), such that light emitted in the first direction impinges multiple tiered facets 36 located at different axial positions within the upper portion of the waveguide, and light emitted in the second direction impinges multiple tiered facets located at different axial positions in the lower portion of the waveguide. If the light source emitted a single, narrow ray of light, only a single tiered facet would be struck and the sensor would be unable to take an accurate reading. Additionally, light emitted from the photo source passes through curved optical devices 46, such as Winston reflectors, which direct an increased portion of the total light emitted towards the first and second axial ends. This increased portion of light is needed to compensate for losses attributable to the long light path from the center of the waveguide to each of its extreme axial ends. Such compensation is less required for the light which strikes the tiered facets closest to the photo source. Photo receiver 40 is a photo-optical receiver capable of receiving light and producing an electronic signal indicative of the intensity of the light received. Although not seen in FIG. 2, optical fuel level sensor 16 has a power signal input for receiving an electrical power signal from power source 12 and a signal output for providing an electronic fuel level signal indicative of the fuel level within the fuel tank.

Figure 3:
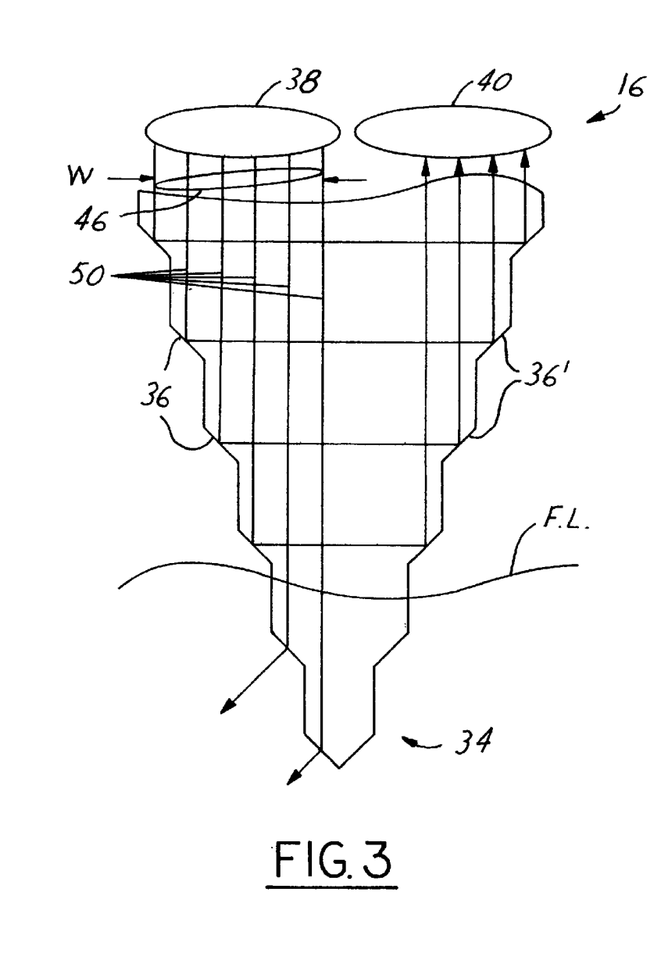
FIG. 3 is an enlarged view of the lower portion of the optical fuel level sensor seen in FIG. 2.

In operation, optical fuel level sensor 16 is able to produce an electronic fuel level signal representative of the fuel level within the fuel tank by directing photo source 38 to emit a quantity of light within waveguide body 30, measuring the portion of emitted light that is reflected back to photo receiver 40, and generating the fuel level signal based upon the measured amount of reflected light. Referring now to FIG. 3, which is an enlarged view of the lower portion of the sensor seen in FIG. 2 (with only a single layer of tiered facets), there is seen a plurality of light rays 50 being emitted from photo source 38. As previously mentioned, it is important that the photo source emit a light path having a width W such that the path is wide enough to strike the multiple tiered facets 36 located at different axial positions. Alternatively, the photo source could emit a plurality of individual parallel light rays each designed to strike a different tiered facet, as long as all of the tiered facets are impinged. As the light rays emanate from the photo source they pass through curved optical device 46, such that an increased portion of the rays are focused towards second axial end 34. As seen in FIG. 3, those light rays 50 which strike tiered facets 36 located at axial positions above the fuel level (F.L.) are reflected back into the waveguide at an angle that is approximately perpendicular to the axial length of the waveguide. After being reflected, those rays extend across the width of the waveguide and strike an opposing tiered facet 36' located at an equivalent axial position as the facet originally impinged. Tiered facets 36' are angled such that light reflected from them travels again in a direction generally parallel to the axial length of the waveguide and strikes photo receiver 40. The reflection off of the tiered facets 36 and 36' arises due to the optical phenomenon known as total internal reflection. That is, the ratio of the index of refraction of the waveguide to the index of refraction of the material located on the other side of the interface (air when the fluid level is below the impinged facet and fuel when the fluid level is above the impinged facet) determines whether or not the light will be reflected back into the waveguide or refracted out of the waveguide. The waveguide is composed of an optically conductive material chosen such that its index of refraction will allow for reflection when the surrounding environment is air, but will refract when the surrounding environment is fuel. Thus, light rays 50 which strike tiered facets 36 located at axial positions below the fuel level (F.L.) do not reflect back into and across the waveguide as the higher impinging light rays do, rather, they strike the tiered facet and refract out of the waveguide and into the fuel tank. This process of emitting and receiving light according to the fuel level is conducted in both the upper and lower portions of the waveguide, even though only the lower portion is seen in FIG. 3. Following reception of the reflected light, photo receiver 40 produces an electronic fuel level signal indicative of the fuel level. That signal may simply be an electronic signal whose voltage is representative of the amount of light received by the photo receiver. In such a case, the SIE could process the signal by using commonly known filtering techniques, and could drive a fuel gauge or other instrumentation with the filtered signal.

Figure 4:
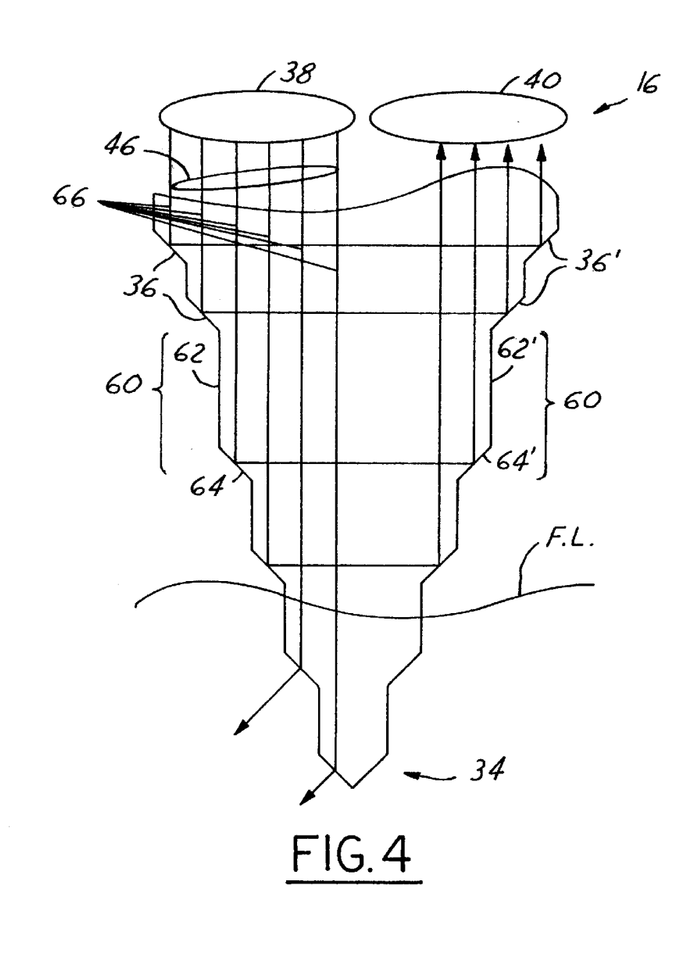
FIG. 4 is an enlarged view of the lower portion of a second embodiment of the optical fuel level sensor of the present invention having a calibration feature.

Referring now to FIG. 4, there is seen a second embodiment of the optical fuel level sensor 16 of the present invention having a calibration feature 60, wherein the calibration feature is used to produce electronic calibration information for offsetting any long term drift effect in the sensor circuitry. The structure and operation of this second embodiment is largely the same as the first embodiment seen in FIG. 3, however, in addition to having a photo source 38, photo receiver 40, tiered facets 36, 36', this embodiment also includes calibration feature 60. The calibration feature includes a pair of longitudinal waveguide segments 62, 62' and a pair of opposing tiered facets 64, 64', wherein longitudinal waveguide segments 62, 62' are of a longer length than the adjacent waveguide segments; the ones shown in FIG. 4 are of a longer length, however, waveguide segments having a shorter length could be used as well. Tiered facets 64, 64' are essentially the same as those previously discussed.

In operation, light rays 66 are emitted from photo source 38 such that they pass through curved optical device 46 and strike a plurality of tiered facets located at different axial positions within the waveguide. When the fuel tank is full such that the fuel level (F.L.) is at an axial position above the uppermost tiered facet seen in FIG. 4, all of the tiered facets below the photo source are submersed in fuel and thus refract light out of the waveguide. Consequently, the photo receiver does not receive any of the light emitted from the photo source. As the associated engine is operated, fuel is being drawn from the fuel tank to supply the combustion process, thus causing the fuel level to decrease within the fuel tank. Each time the fuel level recedes past an axial position having a pair of tiered facets, thus leaving them above the fuel level, photo receiver 40 receives an increased amount of light. In this manner, the various fuel levels that the sensor is capable of measuring are discrete levels; the more axial positions having tiered facets the greater the resolution of the sensor. For instance, when the fuel level recedes to an axial position lower than the uppermost tiered facet seen in FIG. 4 such that the tiered facet is fully exposed, a light ray which strikes that facet will now be reflected to the photo receiver. Thus, the photo receiver will recognize that the fuel level has subsided a certain amount due to the presence of the newly reflected light ray. Further recession of the fuel level causes additional tiered facet pairs to become exposed, thereby reflecting new rays of light to the photo receiver in addition to those rays already being reflected by tiered facet pairs located at axial positions above. Because calibration feature 60 has a much longer axial segment 62 than those separating other adjacent tiered facets, it takes longer for the fuel level to recede the entire axial length of longitudinal segment 62. The increased amount of time it takes for the photo receiver to recognize the transition from the discreet fuel levels above and below calibration feature 60, relative to the other amounts of time between discreet levels, is the basis for the calibration information used by the SIE.

Once the SIE is aware that the calibration feature has been encountered, regardless of the fuel level readings being conveyed by the sensor, the SIE knows that the fuel level is at a predetermined position coinciding with the permanent position of the calibration feature, a position which is constant and not affected over time. In this embodiment, the sensor provides the SIE with calibration information embedded within the electronic fuel level signal. One method of processing this information involves the SIE measuring the rate of change of the fuel level by recording the amount of time between successive fuel level readings. Thus, when the SIE records the noticeably longer amount of time needed for the fuel level to recede down the increased length of axial segment 62, it will be alerted that the fuel level is currently at a position corresponding with the permanent predetermined position of the calibration feature. Accordingly, the SE can immediately calibrate the sensor by offsetting the entire error between the current reading and the known predetermined position, or the SIE can gradually calibrate the sensor by offsetting it over a period of time so as to not produce sudden, erratic changes in the fuel level reading. Additionally, the SIE can use the natural movement of the fuel within the fuel tank to calculate the rate of change of the signal from the photo receiver. By recording and storing the signal level at which the discontinuity in the rate of change occurs, a correction factor can be determined which can then be applied to the signal from the photo sensor, thus, canceling any cumulative error. Also, the SIE can be designed to receive an electronic signal indicating the current fuel consumption rate of the engine, such as a throttle position signal. This information allows the SE to take into account the fact that the periods of time between successive fuel levels can be affected by the rate at which the engine is consuming fuel. Additional features and methods for processing the fuel level signal and the calibration information exist, and can be used without departing from the scope of the present invention.

Figure 5:
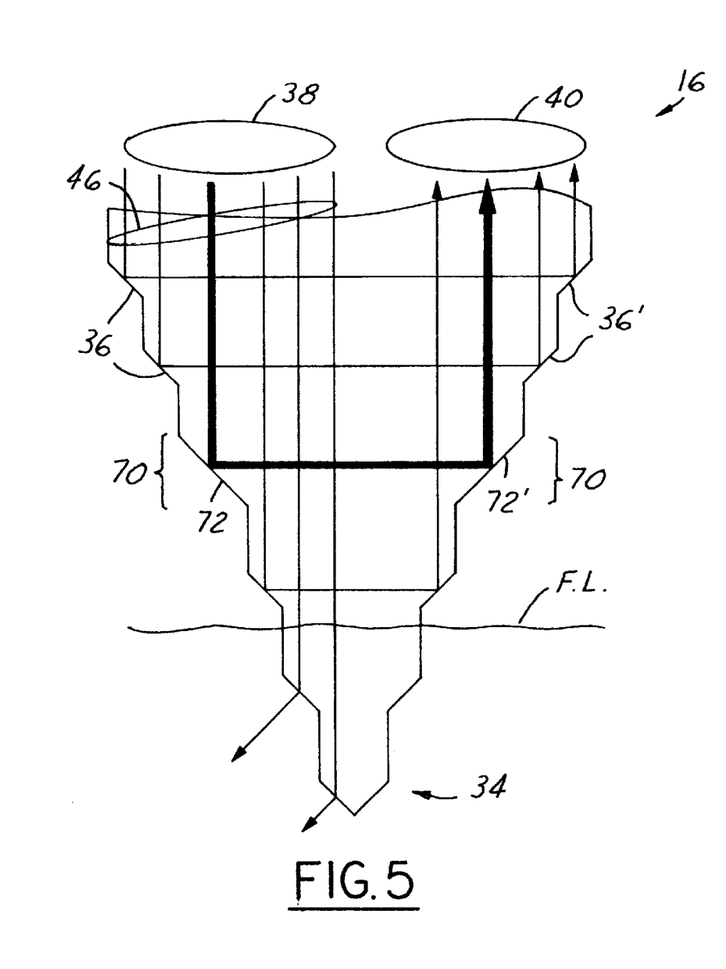
FIG. 5 is an enlarged view of the lower portion of a third embodiment of the optical fuel level sensor of the present invention having a calibration feature.

Referring now to FIG. 5, there is seen a third embodiment of the fuel level sensor of the present invention having a calibration feature 70. Like the optical fuel level sensor seen in FIG. 4 and discussed above, this third embodiment includes a calibration feature 70 which includes a pair of tiered facets 72, 72' located at a predetermined axial position within the fuel tank. The tiered facets 72, 72' have enlarged reflective surface such that they are capable of reflecting more light than the typical tiered facets 36, 36'. Thus, when the fuel level recedes to an axial position low enough to expose the enlarged facets 72, 72', an increased amount of light is received by photo receiver 40.

In operation, as the fuel level within the fuel tank recedes, it exposes tiered facets located at various axial positions that were previously submersed. Each time a new pair of tiered facets is exposed, an additional portion of the total light emitted from the photo source is received by the photo receiver. As long as tiered facets 36, 36' are uniform in size and other reflective characteristics, the discreet amount of light received by the photo receiver per facet pair is generally the same. However, when the calibration feature 70 reflects light to the receiver, its enlarged surface area allows it to reflect a greater amount of light than the typical tiered facet 36, 36', thereby affecting the electronic fuel level signal being sent to the SIE. Similarly to the embodiment seen in FIG. 4, the sensor of FIG. 5 provides the electronic calibration information, which is the increased strength compared to previous signals, within the electronic fuel level signal. Thus, the SIE is able to determine when the fuel level is at a known, predetermined axial position by the increased amount of light received by photo receiver 40, which is reflected in the calibration information produced by the sensor. As previously discussed, the SIE can either immediately correct any disparity that may exist between the current fuel level reading and the predetermined calibration position, or it may gradually correct the error over a period of time.

Figure 6:
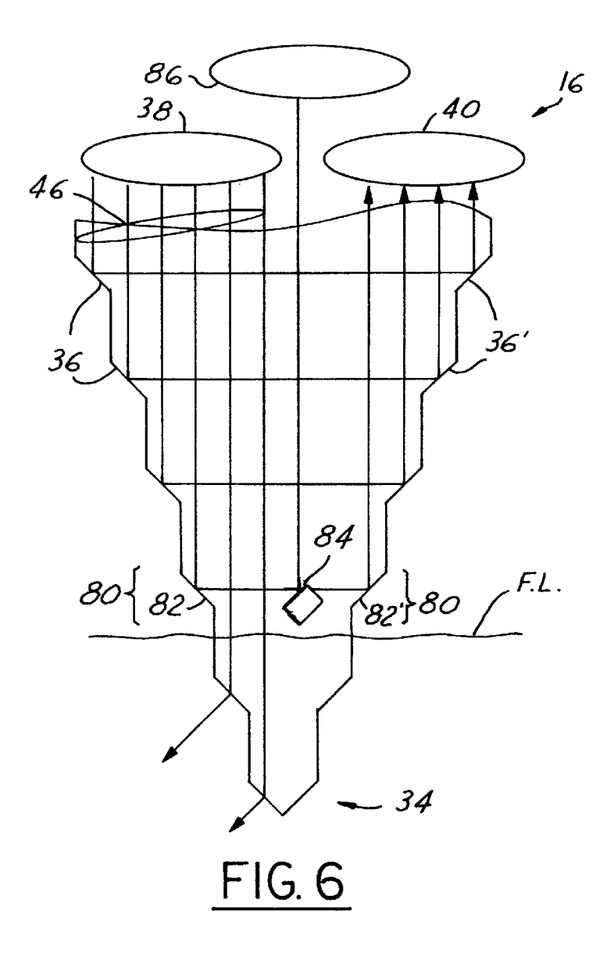
FIG. 6 is an enlarged view of the lower portion of a fourth embodiment of the optical fuel level sensor of the present invention having a calibration feature.

In reference to FIG. 6, a fourth embodiment of the present invention is seen and includes a calibration feature 80. Embedded within the waveguide body 30, or affixed to the waveguide surface, such that it is able to reflect light being conducted within the waveguide, is calibration feature 80. The calibration feature 80 includes a pair of tiered facets 82, 82', a reflective element 84, and an additional photo receiver 86. Other than light reflected from reflective element 84, the additional photo receiver does not receive light from any other source. Thus, the SIE knows when the fuel level is at a known, predetermined level by the reception of an electronic signal indicating the presence of light at the additional photo receiver.

In operation, when the fuel level within the fuel tank recedes to an axial position lower than the pair of tiered facets 82, 82', light from the photo source reflects off of facet 82, strikes and reflects off of reflective element 84, and is transmitted to additional photo receiver 86. The reception of light by the additional photo receiver causes that receiver to provide the SIE with an additional electronic signal, a signal containing calibration information which alerts the SE that the fuel level within the tank has reached a predetermined level. In this manner, it is possible for the fuel level sensor to provide the SIE with separate electronic signals, one being a fuel level signal provided by photo receiver 40, and the other being an electronic signal carrying calibration information provided by additional photo source 86.

Thus far, the embodiments seen in FIGS. 3–6 have each been described as only a lower portion of an overall fuel level sensor; the upper portion not being seen. It is worth noting, each of those embodiments could also represent an entire fuel level sensor, that is, a fuel level sensor having a single tapered axial end, as opposed to the double tapered axial end previously seen and discussed.

It will thus be apparent that there has been provided in accordance with the present invention an optical fuel level sensor for use in a fuel tank associated with an internal combustion engine which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For instance, the fuel level sensor could be constructed such that light rays striking a tiered facet located at an axial position above the fuel level would be refracted out of the waveguide, while those light rays striking tiered facets located below the fuel level would be reflected into the waveguide. Also, the optical fuel level sensor could easily be adapted to measure the level of fluids other than fuel. Furthermore, the SIE could process the electronic signals sent by the sensor according to any of a number of different methods. All such variations and modifications are intended to come within the spirit and scope of the appended claims.

What is claimed is:

1. An optical fluid level sensor for use with a fluid vessel, comprising:

a waveguide capable of conducting light and having an outer periphery that includes a plurality of tiered facets, each of said tiered facets being capable of both reflecting light internally within said waveguide and refracting light out of said waveguide according to the absence or presence of fluid against said tiered facet, said waveguide also including a calibration feature having at least one tiered facet located at a predetermined position and capable of refracting light out of the waveguide in the presence of the fluid against said tiered facet and reflecting light internally within said waveguide in the absence of the fluid against said tiered facet, said at least one tiered facet of the calibration feature having at least one of a different size and a longitudinal waveguide segment of a different length than the other tiered facets, a photo source capable of emitting light into said waveguide, and a photo receiver capable of receiving light from said waveguide, wherein said sensor is capable of utilizing the light received by said photo receiver to provide an electronic fluid level signal representative of a fluid level within the vessel and wherein said sensor is further capable of utilizing the light received from said tiered facet of the calibration feature to provide calibration information in an electronic signal that identifies when the fluid level reaches said predetermined position.

2. An optical fluid level sensor as defined in claim 1, wherein said sensor is a fuel level sensor and the fluid is liquid fuel.

3. An optical fluid level sensor as defined in claim 1, wherein said photo source and said photo receiver are located at an end of said waveguide.

4. An optical fluid level sensor as defined in claim 1, wherein each of said tiered facets is capable of internally reflecting light within said waveguide when said facet is located at an axial position above the fluid level and is capable of refracting light out of said waveguide when said facet is immersed within the fluid.

5. An optical fluid level sensor for use with a fluid vessel, comprising;

a waveguide capable of conducting light and having an outer periphery that includes a plurality of tiered facets, each of said tiered facets being capable of both reflecting light internally within said waveguide and refracting light out of said waveguide according to the absence or presence of fluid against said tiered facet, said waveguide also including a calibration feature located at a predetermined position, said calibration feature includes a tiered facet having a different size than other tiered facets, a photo source capable of emitting light into said waveguide, and a photo receiver capable of receiving light from said waveguide, wherein said sensor is capable of utilizing the light received by said photo receiver to provide an electronic fluid level signal representative of a fluid level within the vessel and wherein said sensor is further capable of providing calibration information in 4n electronic signal that identifies when the fluid level reaches said predetermined position.

6. An optical fluid level sensor for use with a fluid vessel, comprising:

a waveguide capable of conducting light and having an outer periphery that includes a plurality of tiered facets, each of said tiered facets being capable of both reflecting light internally within said waveguide and refracting light out of said waveguide according to the absence or presence of fluid against said tiered facet, said waveguide also including a calibration feature located at a predetermined position.

said calibration feature includes a longitudinal segment located between adjacent tiered facets, said longitudinal segment having a different length than other longitudinal segments, a photo receiver capable of receiving light from said waveguide, wherein said sensor is capable of utilizing the light received by said photo receiver to provide an electronic fluid level signal representative of a fluid level within the vessel and wherein said sensor is further capable of providing calibration information in an electronic signal that identifies when the fluid level reaches said predetermined position.

7. An optical fluid level sensor as defined in claim 1, wherein said calibration feature includes a reflective element which in cooperation with the tiered facet of the calibration feature is capable of reflecting light originating from said photo source to a second photo receiver.

8. An optical fluid level sensor as defined in claim 1, wherein said tiered facets comprise first and second sets of opposing angled surfaces, with each of said first and second sets extending along an opposite side of said outer periphery.

9. An optical fluid level sensor for use with a fluid vessel, comprising:

a waveguide capable of conducting light and having an outer periphery that includes a plurality of tiered facets, each of said tiered facets being capable of both reflecting light internally within said waveguide and refracting light out of said waveguide according to the absence or presence of fluid against said tiered facet, said tiered facets comprise first and second sets of opposing angled surfaces, with each of said first and second sets extending along an opposite side of said outer periphery, said waveguide also including a calibration feature located at a predetermined position, said calibration feature includes a first angled surface of said first set and a second angled surface of said second set, said first and second angled surfaces having a different size than other angled surfaces of said first and second sets, a photo source capable of emitting light into said waveguide, and a photo receiver capable of receiving light from said waveguide, wherein said sensor is capable of receiving the light received by said photo receiver to provide an electronic fluid level signal representative of a fluid level within the vessel and wherein said sensor is further capable of providing calibration information in an electronic signal that identifies when the fluid level reaches said predetermined position.

10. An optical fluid level sensor for use with a fluid vessel, comprising:

a waveguide capable of conducting light and having an outer periphery that includes a plurality of tiered facets, each of said tiered facets being capable of both reflecting light internally within said waveguide and refracting light out of said waveguide according to the absence or presence of fluid against said tiered facet, said tiered facets comprise first and second sets of opposing angled surfaces, with each of said first and second sets extending along an opposite side of said outer periphery, said waveguide also including a calibration feature located at a predetermined position, said calibration feature includes a first longitudinal segment located between adjacent angled surfaces of said first set and a second longitudinal segment located between adjacent angled surfaces of said second set, said first and second longitudinal segments having a different length than other longitudinal segments of said first and second sets, a photo source capable of emitting light into said waveguide, and a photo receiver capable of receiving light from said waveguide, wherein said sensor is capable of utilizing the light received by said photo receiver to provide an electronic fluid level signal representative of a fluid level within the vessel and wherein said sensor is further capable of providing calibration information in an electronic signal that identifies when the fluid level reaches said predetermined position.

11. An optical fluid level sensor as defined in claim 8, wherein said calibration feature includes a reflective element which in cooperation with the tiered facet of the calibration feature is capable of reflecting light originating from said photo source to a second photo receiver.

12. An optical fluid level sensor for use with a fluid vessel, comprising;

a waveguide capable of conducting light and having an outer periphery that includes a plurality of tiered facets, each of said tiered facets being capable of both reflecting light internally within said waveguide and refracting light out of said waveguide according to the absence- or presence of fluid against 54id tiered facet, and said waveguide has a tapered first axial end and a tapered second axial end.

13. An optical fluid level sensor as defined in claim 12, wherein said photo source and said photo receiver are located at a position approximately equidistant from said first and second tapered axial ends.

14. An optical fluid level sensor as defined in claim 13, wherein said photo source is capable of internally emitting light within said waveguide in directions generally towards said first and second axial ends and said photo receiver is capable of receiving light from within said waveguide in directions generally from said first and second axial ends.

15. An optical fluid level sensor as defined in claim 1, wherein said electronic signal containing said calibration information is included within said electronic fluid level signal.

16. An optical fluid level sensor as defined in claim 1, wherein said electronic signal containing said calibration information is a separate signal from said electronic fluid level signal.

17. A fuel level sensing system for use with a fuel tank, comprising;
   a power source having an output for providing an electrical power signal,
   an optical fuel level sensor mounted within the fuel tan, said sensor comprising:
      a waveguide capable of conducting light and having an outer periphery that includes a plurality of tiered facets, each of said tiered facers being capable of both reflecting light internally within said waveguide and refracting light out of said waveguide according to the absence or presence of fluid against said tiered facet, said waveguide also including a calibration feature having at least one tiered facet located at a predetermined position and capable of both reflecting light internally within said waveguide and refracting light out of said waveguide according to the absence or presence of fluid against said tiered facet, said at least one tiered facet of the calibration feature having at least one of a different size and a longitudinal waveguide segment of a different length than the other tiered facets,
      a photo source capable of emitting light into said waveguide,
      a photo receiver capable of receiving light from said waveguide, and
      a signal output for providing an electronic fuel level signal, wherein said sensor is capable of utilizing the light received by said photo receiver to provide said fuel level signal which is representative of the fuel level within the fuel tank and wherein said sensor is further capable of utilizing light received from said tiered facet of the calibration feature to provide calibration information in an electronic signal, and
   an interface electronics unit having a first input coupled to said signal output of said sensor for receiving said fuel level signal and a second input coupled to said power source output for receiving said power signal, wherein said electronics unit is capable of utilizing said fuel level signal to determine the fuel level within the fuel tank and wherein said electronics unit is capable of receiving and utilizing said calibration information to calibrate said sensor with reference to said predetermined position.

18. An optical fluid level sensor for use with a fluid vessel, comprising:
   a waveguide capable of conducting light and having a tapered first axial end, a tapered second axial end, and an outer periphery that includes a plurality of tiered facets, each of said tiered facets being capable of both reflecting light internally within said waveguide and refracting light out of said waveguide according to the absence or presence of fluid against said tiered facet,
   a photo source located at a position approximately equidistant from said first and second axial ends and being capable of emitting light into said waveguide in a first direction generally towards said first axial end and in 4 second direction generally towards said second axial end, and
   a photo receiver located at a position approximately equidistant from said first and second axial ends and being capable of receiving light from within said waveguide from said first and second directions, wherein said sensor is capable of utilizing the light received by said photo receiver to provide an electronic fluid level signal representative of a fluid level within the vessel.

19. An optical fluid level sensor as defined in claim 18, wherein said sensor is a fuel level sensor.

20. An optical fluid level sensor as defined in claim 18, wherein each of said tiered facets is capable of internally reflecting light within said waveguide when said facet is located at an axial position above the fluid level and is capable of refracting light out of said waveguide when said facet is immersed within the fluid.

21. An optical fluid level sensor as defined in claim 18, wherein said waveguide includes a calibration feature located at a predetermined position such that said sensor is capable of providing calibration information in an electronic signal that identifies when the fluid level reaches said predetermined position.

22. An optical fluid sensor as defined in claim 21, wherein said calibration feature includes a tiered facet having a different size than other tiered facets.

23. An optical fluid level sensor as defined in claim 21, wherein said calibration feature includes a longitudinal segment located between adjacent tiered facets, said longitudinal segment having a different length than other longitudinal segments.

24. An optical fluid level sensor as defined in claim 21, wherein said calibration feature includes a reflective element capable of reflecting light, originating from said photo source to a second photo receiver.

25. A fuel level sensing system for use with a fuel tank, comprising:
   a power source having an output for providing an electrical power signal,
   an optical fuel level sensor mounted within the fuel tank, said sensor comprising:
      a waveguide capable of conducting light and having a tapered first axial end, a tapered second axial end, and an outer periphery that includes a plurality of tiered facets, each of said tiered facets being capable of both reflecting light internally within said waveguide and refracting light out of said waveguide according to the absence or presence of fuel against said tiered facet,
      a photo source located at a position approximately equidistant from said first and second axial ends and being capable of emitting light into said waveguide in a first direction generally towards said first axial end and in a second direction generally towards said second axial end,
      a photo receiver located at a position approximately equidistant from said first and second axial ends and being capable of receiving light from within said waveguide from said first and second directions, a signal output for providing an electronic fuel level signal, and an interface electronics unit having a first input coupled to said signal output of said sensor for receiving said fuel level signal, and a second input coupled to said power source output for receiving said power signal, wherein said sensor is capable of utilizing the light received by said photo receiver from said first and second directions to provide said fuel level signal which said electronics unit utilizes TO determine the fuel level within the fuel tank.

26. An optical fuel level sensor for use with a fuel tank, comprising:

a waveguide capable of conducting light and having a tapered first axial end, a tapered second axial end, an outer periphery that includes a plurality of tiered facets, each of said tiered facets being capable of both reflecting light internally within said waveguide and refracting light out of said waveguide according to the absence or presence of fuel against said tiered facet, said waveguide also including a calibration feature located at a predetermined position, a photo source located at a position approximately equidistant from said first and second axial ends and being capable of emitting light into said waveguide in a first direction generally towards said first axial end and in a second direction generally towards said second axial end, and a photo receiver located at a position approximately equidistant from said first and second axial ends and being capable of receiving light from within said waveguide from said first an second directions, wherein said sensor is capable of utilizing the light received by said photo receiver from said first and second directions to provide an electronic fuel level signal representative of a fuel level within the fuel tank and wherein said sensor is further capable of providing calibration information in an electronic signal that identifies when he fuel level reaches said predetermined position.

* * * * *

UNITED STATES PATENT AND TRADEMARK OFFICE
CERTIFICATE OF CORRECTION

PATENT NO. : 6,668,645 B1  
DATED : December 30, 2003  
INVENTOR(S) : Daniel A. Gilmour et al.

It is certified that error appears in the above-identified patent and that said Letters Patent is hereby corrected as shown below:

Column 9,
Line 27, delete "4n" and insert -- an --.

Column 10,
Line 65, after "absence" delete "-"; and delete "54id" and insert -- said --.

Column 11,
Line 25, delete "tan" and insert -- tank --.

Column 12,
Line 9, delete "4" and insert -- a --.

Column 13,
Line 12, delete "TO" and insert -- to --.

Signed and Sealed this

Sixteenth Day of March, 2004

JON W. DUDAS  
*Acting Director of the United States Patent and Trademark Office*